United States Patent
Goossen (10) Patent No.: US 8,328,130 B2
(45) Date of Patent: Dec. 11, 2012

(54) VERTICAL TAKE OFF AND LANDING UNMANNED AERIAL VEHICLE AIRFRAME STRUCTURE

(75) Inventor: Emray Goossen, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 291 days.

(21) Appl. No.: 12/506,052

(22) Filed: Jul. 20, 2009

(65) Prior Publication Data

US 2010/0140415 A1 Jun. 10, 2010

Related U.S. Application Data

(60) Provisional application No. 61/120,681, filed on Dec. 8, 2008.

(51) Int. Cl.
 *B64C 29/00* (2006.01)
(52) U.S. Cl. .............. 244/23 A; 244/17.23; 244/17.11
(58) Field of Classification Search .......... 244/53 B, 244/17.23, 76 R, 7 A, 23 A, 12.3, 12.2, 54, 244/133, 7 B, 119, 55; 60/228
See application file for complete search history.

(56) References Cited

U.S. PATENT DOCUMENTS

| | | | |
|---|---|---|---|
| 2,787,330 A * | 4/1957 | Mathisen | 169/28 |
| 3,606,570 A * | 9/1971 | Haggerty | 416/2 |
| 4,828,203 A | 5/1989 | Clifton et al. | |
| 5,150,857 A | 9/1992 | Moffitt et al. | |
| 5,152,478 A | 10/1992 | Cycon et al. | |
| 5,277,380 A * | 1/1994 | Cycon et al. | 244/12.2 |
| 5,295,643 A | 3/1994 | Ebbert et al. | |
| 5,575,438 A | 11/1996 | McGonigle et al. | |
| 5,595,358 A * | 1/1997 | Demidov et al. | 244/7 A |
| 5,695,153 A | 12/1997 | Britton et al. | |
| 5,779,190 A * | 7/1998 | Rambo et al. | 244/54 |
| 5,823,468 A | 10/1998 | Bothe | |
| 6,270,038 B1 * | 8/2001 | Cycon et al. | 244/12.3 |
| 6,398,159 B1 | 6/2002 | Di Stefano | |
| 6,450,445 B1 * | 9/2002 | Moller | 244/23 A |
| 6,547,180 B1 | 4/2003 | Cassidy | |
| 6,561,456 B1 | 5/2003 | Devine | |
| 6,604,706 B1 | 8/2003 | Bostan | |
| 6,691,949 B2 | 2/2004 | Plump et al. | |
| 6,721,646 B2 | 4/2004 | Carroll | |
| 6,783,096 B2 | 8/2004 | Baldwin | |
| 6,848,649 B2 | 2/2005 | Churchman | |
| 6,974,106 B2 | 12/2005 | Churchman | |
| 7,032,861 B2 | 4/2006 | Sanders, Jr. et al. | |
| 7,044,422 B2 | 5/2006 | Bostan | |

(Continued)

FOREIGN PATENT DOCUMENTS

EP 1767453 6/2008

(Continued)

*Primary Examiner* — Christopher P Ellis
*Assistant Examiner* — Medhat Badawi
(74) *Attorney, Agent, or Firm* — Shumaker & Sieffert, P.A.

(57) ABSTRACT

An unmanned aerial vehicle selectively formed of high strength composite structural part portions and lightweight aerodynamic foam portions to provide a low-cost and lightweight UAV that comports with export, civil airspace, and safety regulations. To further to reduce an overall weight of the UAV, mechanical elements are designed to provide multiple functionalities. Structural elements may be manufactured in same or similar non-specialized processes, and non-structural elements manufactured in same or similar non-specialized processes, reducing overall manufacturing costs. Materials and bonding elements are selected to provide frangibility and yet maintain normal flight structural integrity.

20 Claims, 8 Drawing Sheets

U.S. PATENT DOCUMENTS

| | | |
|---|---|---|
| 7,059,562 B2 | 6/2006 | Baldwin |
| 7,249,732 B2 * | 7/2007 | Sanders et al. ............... 244/23 A |
| 7,836,681 B2 * | 11/2010 | Pesyna et al. .................... 60/228 |
| 2003/0062443 A1 * | 4/2003 | Wagner et al. ................ 244/12.3 |
| 2003/0085319 A1 | 5/2003 | Wagner et al. |
| 2004/0094662 A1 | 5/2004 | Sanders, Jr. et al. |
| 2004/0129828 A1 | 7/2004 | Bostan |
| 2005/0082421 A1 | 4/2005 | Perlo et al. |
| 2006/0049304 A1 | 3/2006 | Sanders, Jr. et al. |
| 2006/0144994 A1 | 7/2006 | Spirov et al. |
| 2006/0151666 A1 * | 7/2006 | VanderMey et al. .......... 244/12.3 |
| 2006/0192047 A1 * | 8/2006 | Goossen .................... 244/17.23 |
| 2006/0231675 A1 | 10/2006 | Bostan |
| 2007/0034738 A1 | 2/2007 | Sanders, Jr. et al. |
| 2007/0051848 A1 | 3/2007 | Mantych et al. |
| 2007/0062543 A1 | 3/2007 | Bastian, II et al. |
| 2007/0193650 A1 | 8/2007 | Eannati |
| 2007/0221790 A1 * | 9/2007 | Goossen et al. ............. 244/53 B |
| 2007/0228214 A1 | 10/2007 | Horak |
| 2007/0244608 A1 | 10/2007 | Rath et al. |
| 2007/0262195 A1 | 11/2007 | Bulaga et al. |
| 2007/0295298 A1 | 12/2007 | Mark |
| 2008/0223993 A1 * | 9/2008 | Spirov et al. ................. 244/23 A |
| 2009/0050750 A1 * | 2/2009 | Goossen ..................... 244/76 R |
| 2011/0006166 A1 * | 1/2011 | Arlton et al. .................. 244/7 A |

FOREIGN PATENT DOCUMENTS

| | | |
|---|---|---|
| WO | 94/00347 | 1/1994 |
| WO | 0015497 | 3/2000 |
| WO | 03/033344 | 4/2003 |
| WO | 2004002821 | 1/2004 |
| WO | 2004/101357 | 11/2004 |

* cited by examiner

VERTICAL TAKE OFF AND LANDING UNMANNED AERIAL VEHICLE AIRFRAME STRUCTURE

CROSS REFERENCE TO RELATED APPLICATIONS

This application also claims priority to provisional U.S. Application No. 61/120,681, filed on Dec. 8, 2008, the entire contents of which are herein incorporated by reference.

BACKGROUND

1. Field Of The Invention

The present invention relates, in general, to the field of unmanned aerial vehicle (UAVs). More specifically, it is directed to the field of UAVs capable of vertical take-offs and landings (VTOLs) with one or more ducted fans as the propulsion system.

2. Description of the Related Art

An unmanned aerial vehicle (UAV) is an unpiloted and/or remotely controlled aircraft. UAVs can be either remotely controlled or flown autonomously based on pre-programmed flight plans or more complex dynamic automation and vision systems. UAVs are currently used in a number of military roles, including reconnaissance and attack scenarios. An armed UAV is known as an unmanned combat air vehicle (UCAV).

UAVs are also used in a limited number of civil applications such as firefighting when a human observer would be at risk, police observation of civil disturbances and crime scenes, and reconnaissance support in natural disasters. UAVs are often preferred for missions that are too dull, dirty, dangerous, or expensive for manned aircraft.

There are a wide variety of UAV shapes, sizes, configurations, and characteristics. Modern UAVs are capable of controlled, sustained, level flight and are powered by one or more jets, reciprocating engines, or ducted fans.

Payloads carried by UAVs in civil applications normally include an optical sensor (which may capture image or video in the visible or infrared spectrums, for example) and/or a radar system. A UAV's sophisticated sensors can provide photographic-like images through clouds, rain or fog, and in daytime or nighttime conditions; all in real-time. A concept of coherent change detection in synthetic aperture radar images, for example, allows for search and rescue abilities by determining how terrain has changed over time.

Providing a vertical takeoff and landing (VTOL) capability allows improved portability and allows a UAV to maneuver into situations and be utilized in areas that a fixed-wing aircraft may not.

While UAV's have been utilized extensively in military roles, their use in civil applications has been limited due to cost concerns, export regulations (such as International Traffic in Arms Regulations—ITAR), civil airspace regulations, and safety regulations, for example. Additionally, various regulations related to autonomous flying objects having a weight that could pose a hazard to life and/or property may have limited further penetration of UAV's into civil applications.

SUMMARY

The present application is directed to a vertical take off and landing (VTOL) unmanned aerial vehicle (UAV) that is selectively constructed out of composites, metals, and foams in a manner so as to reduce weight and cost, allow for controlled disintegration by selective implementation of frangible elements, and provide an overall endurance at least approximately equivalent to larger liquid fueled UAV's, for example. A UAV design is provided that separates aerodynamic elements from structural elements, and chooses corresponding materials for each class of elements so as to reduce weight, maintain high structural integrity, and provides a frangible airframe structure. For example, aerodynamic elements previously formed of complex composite layups or metal materials may be replaced with lighter foam injection molded materials. Structural components may then be selectively formed of composite materials having varying strengths, weights, and costs depending on the applied forces that each structural component is expected to encounter. Individual selected items in the airframe structure may themselves be constructed of frangible materials that disintegrate upon impact. By design, parts of the airframe separate when stress levels are exceeded in order to, for example to avoid damage to an object with which it comes into contact with, such as for example, a small manned aircraft.

By selectively reducing component weight, the overall weight of a completed UAV may fall below the limit of many civil regulations as posing a hazard to life and property, thus allowing purchase and operation of the UAV without the additional expenses of obtaining permits and/or special insurance, for example.

A UAV may have several inter-linked components, including a motor, a fan blade assembly, duct rings, stator mounts, motor mounts, stator slipstreams, inter-duct slipstreams, inter-duct interconnects, avionics mounting tubes, landing gear mount, avionics mount, avionics interconnects, vane shaft, tail cone lid, tail cone hinge, tail cone latch, servo gear, landing legs, duct lip, vanes, tail cone, and tail bumper, for example.

Other embodiments may include additional components, substituted components, or a subset of these components.

Structural support elements such as the motor, fan blade assembly, duct rings, stator mounts, motor mounts, stator slipstreams, inter-duct slipstreams, inter-duct interconnects, avionics mounting tubes, landing gear mount, avionics mount, avionics interconnects, vane shaft, tail cone lid, tail cone hinge, tail cone latch, servo gear, and landing legs may be manufactured of wood, metal, or composite materials in order to maintain high structural integrity, for example. Aerodynamic elements such as the duct lip, vanes, tail cone, and tail bumper may be manufactured of a foam material, for example.

Structural interconnect components such as inter-duct interconnects, landing gear mounts, avionics mount, and motor mounts may be designed with composite materials of a specific fiber length to provide sufficient structural integrity but that will separate or disintegrate with the application of sufficiently high stress levels so as to provide structural frangibility. The selective implementation of frangible interconnect components can provide further or additional control over the size and mass of the disintegrated fragments. An objective is balance the normal maneuvering stress and strain against impact and tear strength properties of selected joining points in the airframe so as to fragment the airframe into smaller, lower impact masses. Materials are selected, such as carbon fiber and foams, for key structural points that do not show plastic deformation but fail while the deformation is elastic. For a mid-air collision, the impact and tear strength properties are exceeded causing the airframe to disintegrate into desired mass fragments. Management of elastic, shear modulus, tensile strength, impact strength, and tear strength of the materials at key joining points in the airframe provides the desired frangibility on an application by application basis.

Bonding and attachment mechanisms between duct lip, and tail cones may be accomplished by separable bonding materials that enable replacement of damaged parts and/or support impact frangibility. This may be accomplished by bonding agents such as an RTV compound or by an O-ring mechanism that when stretched releases the attachment.

The one or more motors for powering the one or more ducted fans can be electric motors powered by an on-board electrical power source, such as a battery. The use of an electric motor can minimize vibration and decrease maintenance costs.

In another embodiment, mechanical elements can be designed to provide multiple functionalities. For example, a duct ring supporting a light-weight aerodynamic air duct may also serve as an engine mount, connecting tubes that provide resonance rejection for vibration may also serve as shielded wiring channels, and inter-duct attach points may also serve as landing leg mounts.

Structural elements such as a duct ring, an interduct slipstream, and/or a duct lip could provide dual roles including an serving as an energy storage device such as a battery or fuel cell component integrated into the airframe structure.

Preferably, a UAV constructed according to the instant disclosure should have a total system weight of equal to or less than 4 pounds.

In example embodiments, mechanical elements are provided with two functions, which may reduce total component cost and overall cost of a UAV structure. The structural elements may be manufactured in a same or similar non-specialized process, and non-structural elements may be manufactured in same or similar non-specialized process, reducing overall manufacturing costs.

Other features and further scope of applicability of disclosed embodiments are set forth in the detailed description to follow, taken in conjunction with the accompanying drawings, and will become apparent to those skilled in the art.

DETAILED DESCRIPTION OF THE INVENTION

Aspects of the present application describe a system and method for construction of a light-weight unmanned aerial vehicle (UAV). Aerodynamic and structural elements are selected corresponding to required performance characteristics. Mechanical elements are designed to provide dual functionality and decrease a part count and cost of a corresponding UAV.

Although the following disclosure references a double ducted hovering air-vehicle, it should be appreciated that the present embodiments have a broader applicability in the field of air-borne vehicles. Particular configurations discussed in examples can be varied and are cited to illustrate example embodiments.

Figure 1:
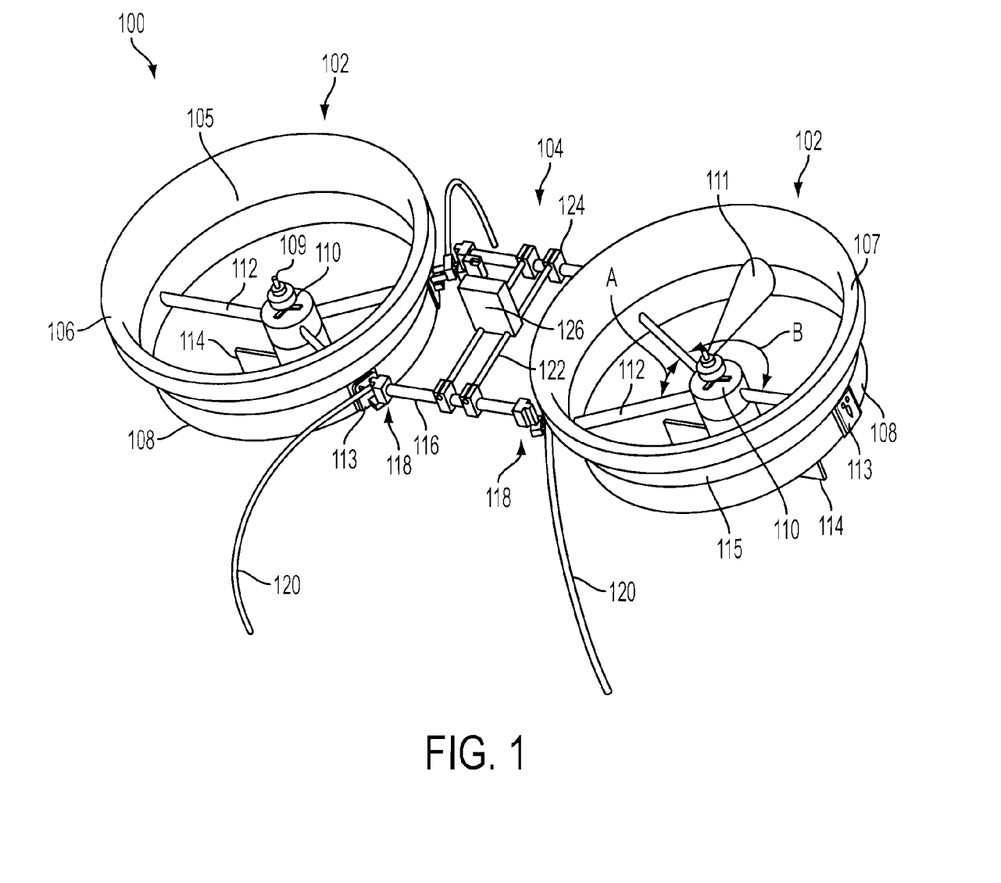
FIG. 1 is a perspective view of an Unmanned Aerial Vehicle (UAV) according to an embodiment.

As set forth in FIG. 1, a UAV 100 according to one embodiment includes ducted fan assemblies 102 interconnected via duct linkage assembly 104. The UAV 100 includes legs 120 to keep the fan assemblies 102 and duct linkage assembly 104 from touching the ground. Although FIG. 1 sets forth two ducted fan assemblies, any number of ducted fan assemblies could be used consistent with this disclosure. For example, a single ducted fan assembly could be used without the need for duct linkage assembly. Alternately, three or more ducted fan assemblies could be interconnected via one or more duct linkage assemblies.

Each ducted fan assembly 102 may include a light-weight aerodynamic duct lip 106 structurally supported by a structurally rigid duct ring 108 extending around an outer circumference of the duct lip 106. The duct lip 106 has a cylindrically shaped lower wall 105 that extends slightly outward in a radial direction towards an upper end of the wall 105 and then bends outwardly and downwardly over itself to form an upper shoulder portion 107.

Housed within the duct lip 106 and duct ring 108 is a motor 109 mounted onto a motor mount 110. The motor mount 110 is in turn secured to the duct ring 108 via stator slipstreams 112. The stator slipstreams 112 are secured to the duct ring 108 via stator mounts 113. While FIG. 1 discloses three stator slipstreams 112, more than three could also be provided. As shown in FIG. 1, a first two of the stator slipstreams 112 are placed at an angle A of less than about 60° apart in order to connect with the duct linkage assembly 104 and provide rigid support for the UAV 100. The third stator slipstream is placed at an angle B of greater than about 60° from either of the first two of the stator slipstreams 112. The angles A and B are set forth as examples only. Other stator slipstream arrangements could also be used.

The stator slipstreams 112 may pass through holes formed in the duct lip 106 and duct ring 108 to reach the stator mounts 113. The stator mounts 113 may be provided on an outer surface of the duct ring 108 to receive and secure one end of the stator slipstreams 112.

Two or more propeller blades 111 may be provided in each ducted fan assembly 102 connected to the motor 109 to provide lift to the UAV. The number of propeller blades 111 is variable and is preferably designed to match motor loading requirements and rpm efficiencies. The motor 109 is preferably an electric motor, for example, a brushless direct current (DC) motor powered by a separately provided battery.

Figure 2:
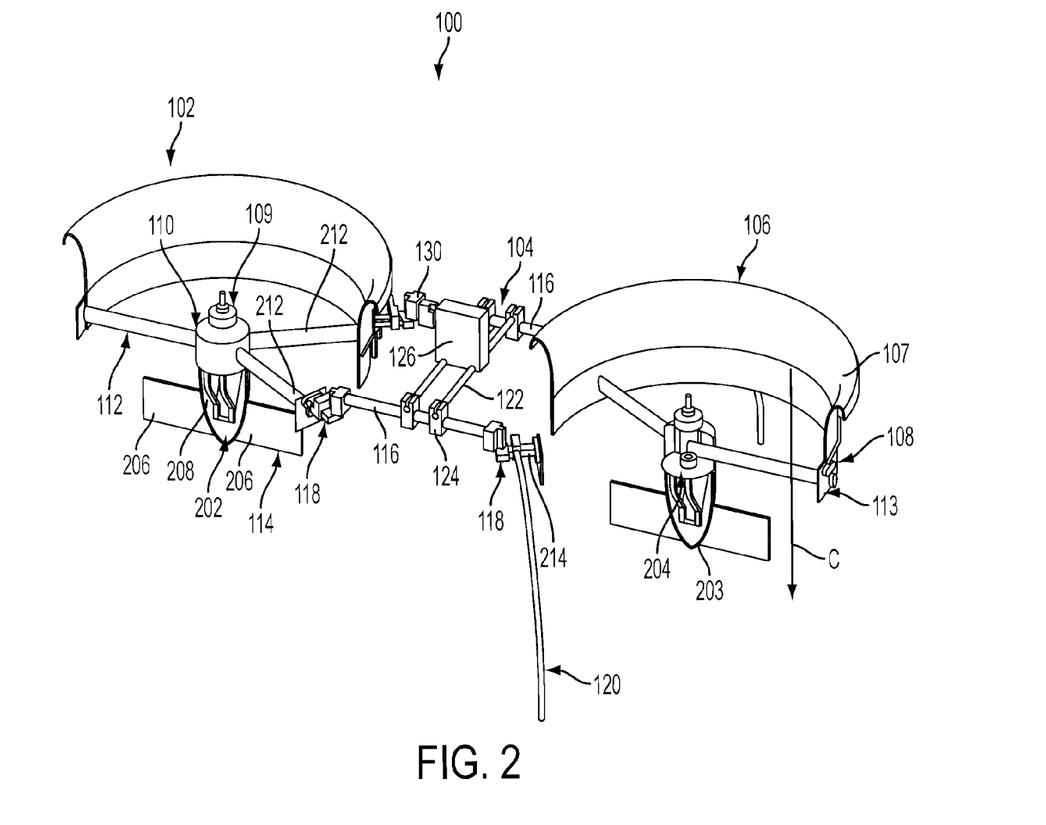
FIG. 2 is a cut-away perspective view of the UAV of FIG. 1.

As shown in FIG. 2, a tail cone assembly 202 is provided including a hollow tail cone 203, a control vane assembly 114, and a servo 204 for tilting vanes 206 relative to a general air flow direction C. The tilt of the vanes 206 relative to the general air flow direction C generates a change in outgoing thrust direction, causing the UAV 100 to move in a corresponding desired direction. A control vane assembly 114 disposed at a lower end of the tail cone 203 includes two oppositely opposed vanes 206 connected via a shaft 208. The shaft 208 is preferably connected to the vanes 206 at a point offset forward from the center of lift of each vane 206. The servo 206 functions to rotate the shaft 208, and therefore the vanes 206, relative to a control signal received from a control circuit. Connection of the molded foam vane 206 to the shaft 208 may be accomplished by a split shaft in a tuning fork configuration, or a shaft extending a flattened perforated surface within the vane 206 to give it rigidity.

As set forth in FIGS. 1 and 2, the UAV 100 includes a duct linkage assembly 104 for rigidly connecting the two ducted fan assemblies 102. The duct linkage assembly 104 includes a plurality of inter-duct slipstreams 116 and a plurality of inter-duct interconnects 118. Each of the inter-duct interconnects 118 connects at one end to a stator mount 113 that is receiving one of two closely spaced stator slipstreams 212, and at the other end to an inter-duct slipstream 116. The inter-duct interconnects 118 of the UAV 100 in one alternative may include a vertical displacement characteristic such that the inter-duct slipstreams 116 are vertically offset in a horizontal plane from a horizontal plane in which the stator slipstreams 212 are disposed.

Each inter-duct interconnect 118 may also serve as a landing leg interconnect and hold a corresponding landing leg 120 in place. Two or more inter-duct slipstreams 116 may be used to connect the two ducted fan assemblies 102.

Figure 3:
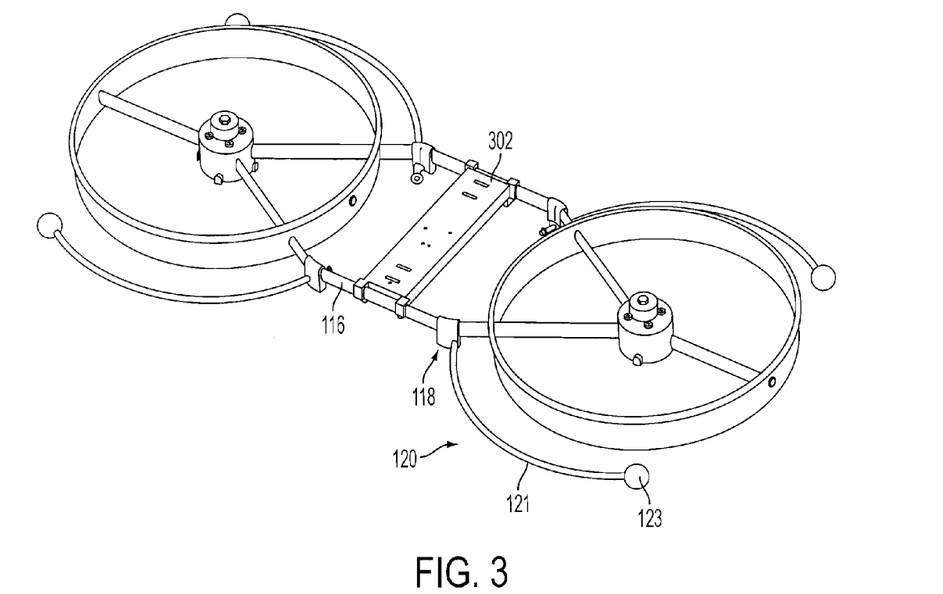
FIG. 3 is a perspective view of a UAV with the landing legs in the stowed position.

As shown in FIG. 3, each landing leg 120 may be attached to the inter-duct interconnect 118 in a spring loaded notched fashion so that the landing gear may be quickly rotated 90 degrees to place the UAV 100 in a stowed position. A shaft portion 121 of the landing gear 120 may be pinned to mate to notches (not shown) on the inter-duct interconnect 118. A spring on an opposing side of the inter-duct interconnect 118 may hold the landing gear in position and may provide some landing shock absorption. Landing leg ball elements 123 attached to a lower end of each shaft portion 121 may be formed of a soft deformable rubber, for example, in order to provide for additional landing shock absorption.

Returning to FIG. 2, the inter-duct slipstreams 116 may also support one or more avionics mounting tubes 122 via avionics interconnects 124. The avionics mounting tubes 122 may provide an avionics mounting area in which an avionics payload 126 may be mounted. An avionics payload 126 may include, for example, control systems, wireless remote control interfaces, a battery source, and/or other flight-enabling systems. Alternatively, and as set forth in FIG. 3, an avionics mounting plate 302 that integrates avionics interconnects into one assembly may be directly mounted to the inter-duct slipstreams 116.

Figure 4:
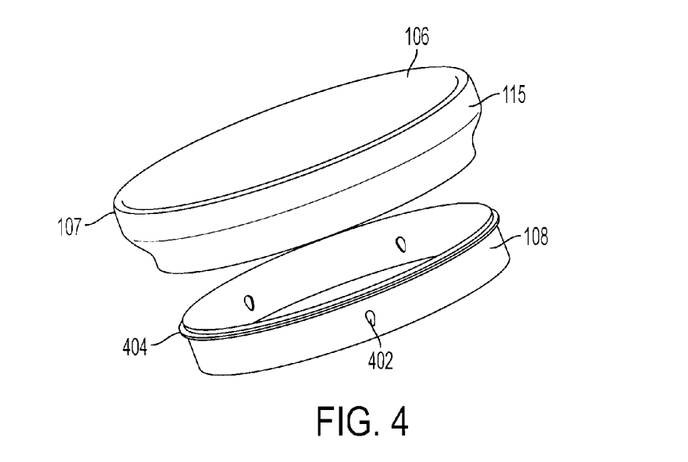
FIG. 4 illustrates an example expanded duct assembly having a duct lip and duct ring.

FIG. 4 sets forth a detailed view of the duct lip 106 and duct ring 108. As set forth earlier, the duct lip has a cylindrically shaped lower wall 105 that projects slightly outward in a radial direction towards an upper end of the wall 105. As best shown in FIG. 2, an upper portion of the wall 105 extends into an outwardly and downwardly bending shoulder portion 107. The lower edge 105 of the duct lip 106 mates with the inside surface of the duct ring 108 and the flange 404 formed on an outside surface of the duct ring 108 to position and secure the duct lip 106 to the duct ring 108. Alternatively the duct lip 106 may have a flange molded into its surface that mates with the duct ring 108 so as to eliminate the need for the protruding flange 404 on the duct ring 108.

The duct lip 106 may instead be attached to the duct ring 108 by application of removable bonding agents to the lower portion of the duct lip 106 and upper outside portion of the duct ring 108. Alternatively, a mechanical snapping or O-ring mechanism could be placed at regular intervals around the ducted fan assemblies 102. Of course, other methods of securing the duct lip 106 to the duct ring 108 could also be used.

The duct ring 108 includes holes 402 patterned in accordance with the distribution pattern of the stator slipstreams 112. The outwardly protruding flange 404 is formed along an outer circumference of the duct ring 108 near an upper edge of the duct ring 108. The flange 404 aids in the placement of the stator mounts 113 on the outer cylindrical surface wall of the duct ring 108 and adds circular rigidity to the duct ring 108.

Figure 5A:
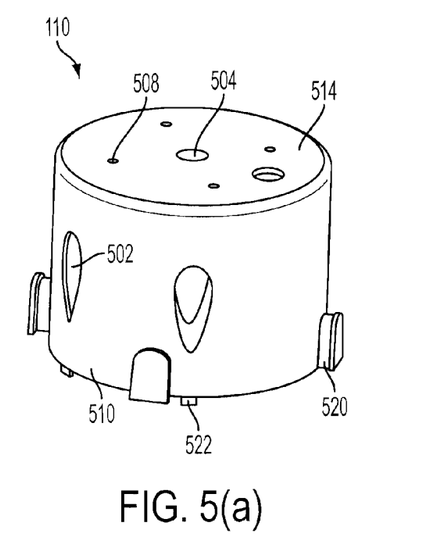
FIG. 5(a) is a top perspective view of an example motor mount.
Figure 5B:
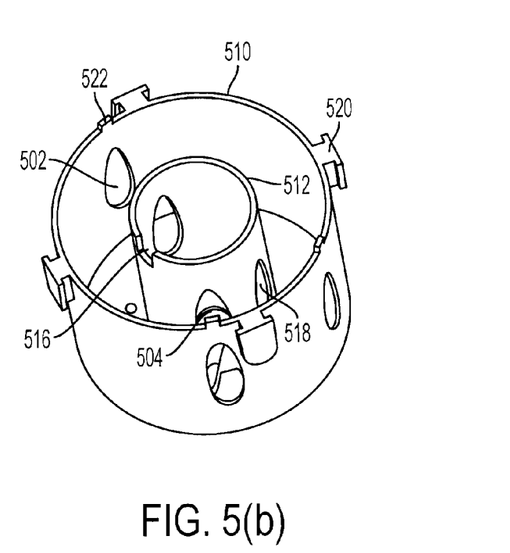
FIG. 5(b) is a bottom perspective view of the example motor mount.

FIGS. 5(a) and 5(b) set forth a top and bottom perspective view, respectively, of the motor mount 110. As shown in FIG. 5(b), the motor mount 110 includes an upper surface 514, a first outer cylindrically-shaped wall 510 extending perpendicularly from an outer circumference of the upper surface 514, and a second inner cylindrically-shaped wall 512 disposed within the outer wall 510 and extending from the upper surface 514 in a same direction as the outer wall 510. Through holes 502 and 518 are correspondingly formed in the first and second walls in a pattern corresponding to the distribution of the stator slipstreams 112.

A wiring hole 506 formed in the upper surface 514 and a notch 516 formed in the inner cylindrical wall 512 allows a wiring (not shown) to be fed into and out of the motor mount 510. Wiring is fed from the motor through the wiring hole 506, across the notch 516 and into one or more of the stator slipstreams 212, and then through the inter-duct slipstreams 116 to the avionics payload 126. A centrally disposed motor drive hole 504 is formed in the upper surface 514 to allow a drive shaft of the motor 109 to extend through the motor mount 110 so as to drive one or more propellers 111. Additional holes 508 are provided in the upper surface 414 for securely mounting a motor 109 to the motor mount 110. O-ring posts 520 extend radially outward from the outer wall 510 and provide an attachment mechanism for the tail cone assembly 202. Alignment tabs 132 extend axially from a bottom surface of the outer wall 510 and mate with corresponding alignment slots formed in the tail cone assembly 202 to properly orient the tail cone assembly 202 to the motor mount 110 and thus to the UAV 100.

Figure 6:
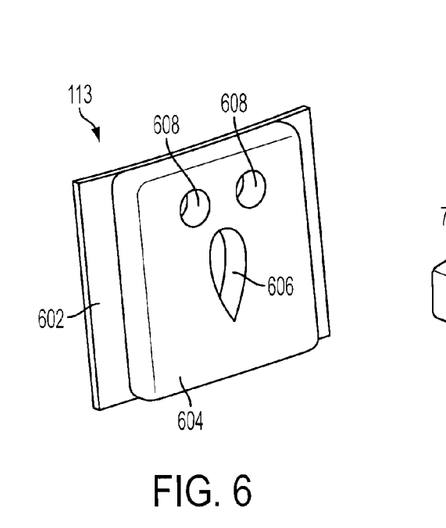
FIG. 6 illustrates an example stator slipstream mount.
Figure 11:
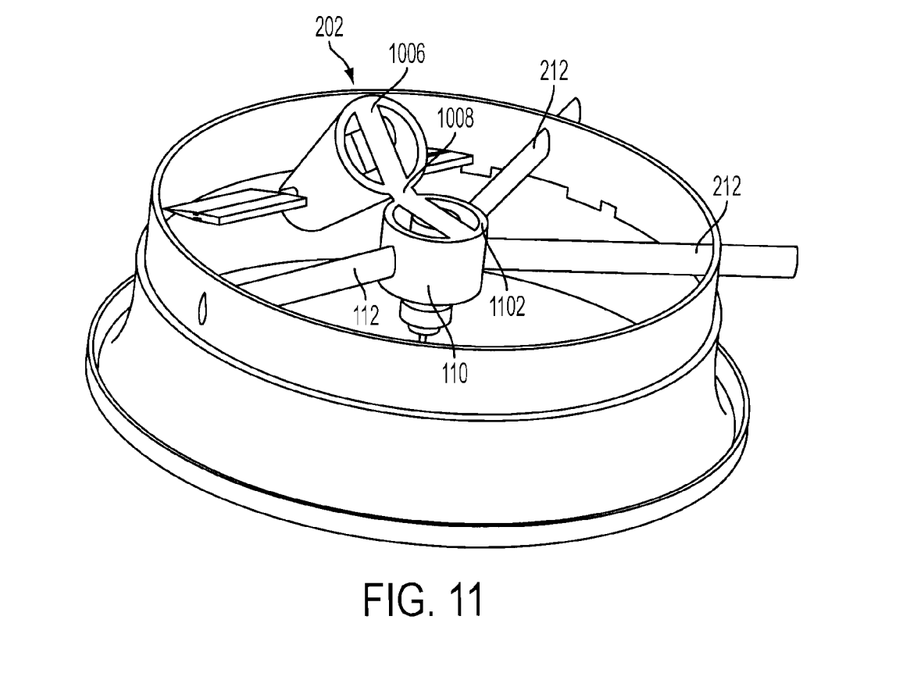
FIG. 11 is a perspective view of a fan assembly including a motor mount and tail cone in which the tail cone is rotated to a stowed position.

FIG. 6 sets forth a perspective view of a stator mount 113. The stator mount 113 has a rectangular-shaped outer-band frame 602 that is curved slightly inward to match a curvature of the duct ring 108. A thicker central section 604 is formed integrally with the frame 602 and includes holes 606 and 608. The through hole 606 is formed in a tear-drop shape substantially the same as the shape of the stator slipstreams 112 so as to rigidly secure the stator mount 113 to a stator slipstream 112. Other shapes could also be used. Alternatively, and as illustrated in FIG. 11, the stator slipstreams 112 could be directly bonded to the duct ring 108 by, for example, applying an adhesive agent or by a type of soldering process.

Returning to FIG. 6, the holes 608 of the stator mount 113 may serve a dual purpose depending upon which stator slipstream 112 a stator mount 113 is secured to. As further set forth in FIG. 2, the stator mounts 113 securing the two closely-angled stator slipstreams 212 may be connected to the inter-duct interconnects 118 via parallel, closely spaced pegs 214. The holes 608 of the stator mounts 112 are sized accordingly to receive and secure the pegs 214. The pegs 214 may also be used to secure the stator mount 113 to the duct ring 108.

Alternately, for the stator mount 113 positioned relative to the stator slipstream 112 spaced at a large angular distance relative to the other two stator slipstreams 212, the holes 608 may be used to secure the stator mount 113 to the duct ring 108 via a fastener such as a rivet or screw, for example.

Figure 7:
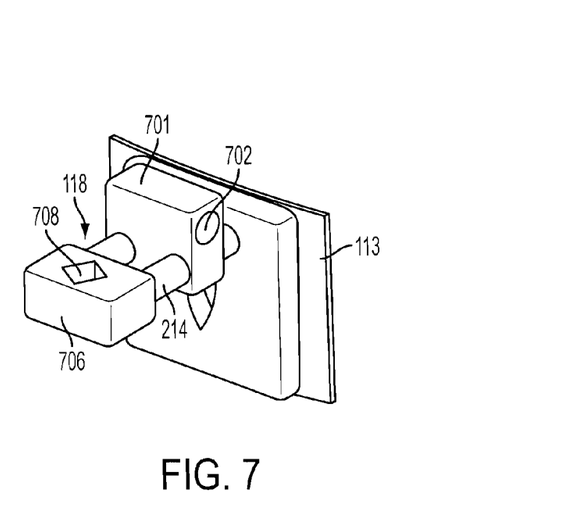
FIG. 7 illustrates an example combined stator, leg, and connecter tube mount structure.

FIG. 7 sets forth a perspective view of an inter-duct interconnect 118 while connected to a stator mount 113. The inter-duct interconnect 118 includes two parallel, closely spaced pegs 214, as mentioned earlier, for securely connecting the inter-duct interconnect 118 with the correspondingly sized holes 608 in the stator mount 113. The pegs 214 may also secure a landing gear mount 701 and an avionics mount 706. The landing gear mount 701 includes a hole 702 for securing a landing gear 120, as shown in FIG. 2. The avionic mount 706 includes a hole 708 formed in an upper surface for receiving a similarly shaped projection formed on an avionics attachment 130, as seen in FIG. 2. By providing an interconnect structure 118 that connects a ducted fan assembly 102 to duct linkage assembly 104, and also includes a landing gear mount 701, the number of components required by a UAV 100 may be reduced, and a total weight and cost of the UAV 100 can be correspondingly reduced.

Figure 8:
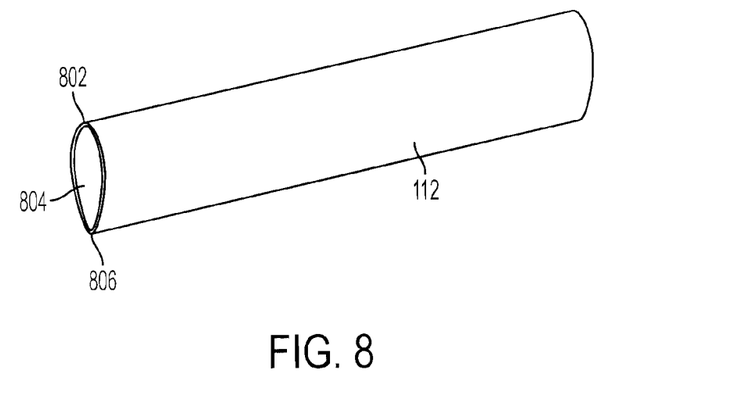
FIG. 8 illustrates an example connector tube for use as a stator slipstream and/or a duct linkage tube.

FIG. 8 sets forth a perspective view of a stator slipstream 112. The stator slipstream 112 of FIG. 8 could also be used as the stator slipstreams 212 of FIG. 2. The stator slipstream 112 performs several functions, including securing the motor 109 and motor mount 110 within the ducted fan assembly 102 to the rigid duct ring 108 and to a stator mount 113, routing power and control cables from the avionics payload 126 to the motor 109 and servo 204 in the ducted fan assembly 102, providing electromagnetic shielding of any and all control and power cables passing there through, and providing an aerodynamic slipstream surface to air flowing through the ducted fan assembly 102 to improve performance and handling of the UAV 100.

The stator slipstream 112 may be formed in a tear-drop shape to match the shapes of the holes 502 formed in the motor mount 110, the holes 402 formed in the duct ring 108, and the holes 606 formed in the stator mount 113. As shown in FIG. 8, the tear-drop shape is comprised of a smooth rounded top-end 802 and a more pointed bottom-end 806. The tear-drop shape of the stator slipstream 112 minimizes air-resistance created by the stator slipstream 112 within the ducted fan assembly 102. Of course, other shapes could also be used.

The stator slipstream 112 is formed to be hollow, providing a wiring path 704 within the stator slipstream 112. By routing wiring from the avionics payload 126 to the motor 109 and/or servo 204 through the stator slipstreams 112, drag can be eliminated compared to routing the wiring along an outside surface of the stator slipstreams 112, and the walls of the stator slipstream and function to electromagnetically shield the cables passing there through.

Figure 9:
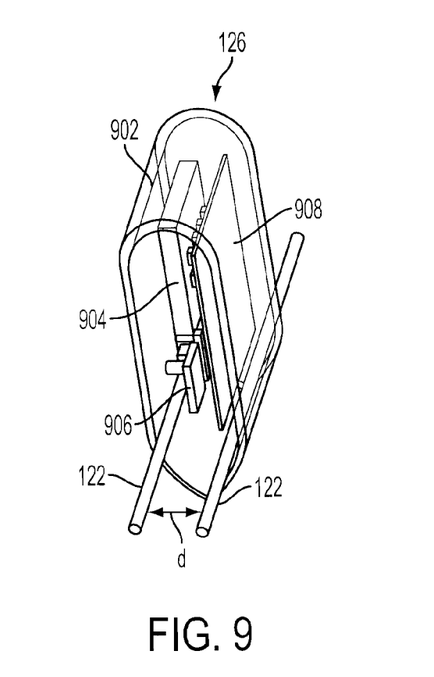
FIG. 9 illustrates an example payload mounted on example payload support tubes.

FIG. 9 sets forth a perspective view of the avionics payload 126 and mounting tubes 122. The mounting tubes 122 are spaced in a parallel manner with a pre-determined distance there between. An outer casing 902 is sized at a width equal to or slightly larger than the width of the tubes 122 and electronics contained therein so as to be able to slide over the mounting tubes 122 and cover the electronics. Inside the outer casing 902 may be housed a battery 904, one or more motor controllers 906, and avionics control systems 908. The avionics control systems 908 may include, among other things, a radio RF transceiver for receiving commands and sending information, translation control system for translating received control commands into signals to control motors and/or tail cone servos, stability control systems for maintaining flight stability, an autonomous flight control system, a global positioning system (GPS), and/or a video image encoding system. Additionally, a subset of, and/or alternative systems may also be included in the avionics control systems 908.

Figure 10:
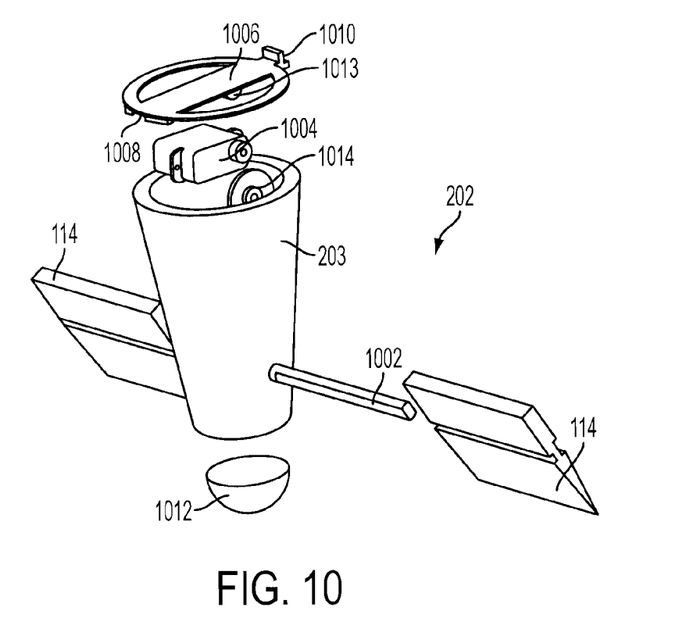
FIG. 10 illustrates a tail cone and servo structure.

FIG. 10 sets forth a perspective view of a tail cone assembly 202. The tail cone assembly 202 comprises a hollow tail cone 203, an end bumper 1012, a vane shaft 1002, vanes 114, servo 1004, and mounting plate 1006. The hollow tail cone 203 has an inverted cone shape having a linear taper in which a narrow end of the cone is cut-off before reaching its peak. At the lower end of the hollow tail cone 203, a solid half-sphere bumper 1012 is provided to close off a lower end of the hollow open-ended cone 203.

On an upper end of the tail cone 203, a tail cone mounting plate 1006 is provided having a hinge 1008 on one end thereof and a latch 1010 on the other. As shown in FIG. 11, a corresponding motor mounting plate 1102 is attached to a lower surface of the outer wall 510 of the motor mount 110. The latch 1010 allows the tail cone mounting plate 1006 to attach and detach from the motor mounting plate 1102. The hinge 1008 allows the tail cone mounting plate 1006 to hingedly attach the tail cone 202 to the motor mount 110 and allows the tail cone 202 to rotate between an open position in which the tail cone is stowed within the ducted fan assembly between the stator slipstream 112 and one of the state slipstreams 212, and a closed position in which the tail cone is rigidly attached to the motor mount 110. A servo mount 1013 is provided on a bottom surface of the tail cone mounting plate 1006 for holding the servo 1004.

In accordance with one embodiment, compositions of respective aerodynamic and structural support elements noted above are selectively chosen to reduce an overall weight of the UAV 100 while maintaining a structural integrity of the UAV 100.

Structural support elements such as the duct rings 108, stator mounts 113, motor mount 110, stator slipstreams 112, inter-duct slipstreams 116, inter-duct interconnects 118, avionics mounting tubes 122, landing gear mount 602, avionics mount 606, avionics interconnects 124, vane shaft 902, tail cone lid 906, tail cone hinge 908, tail cone latch 910, servo gear 914, and landing legs 120 may be manufactured of wood, metal, or composite materials in order to maintain high structural integrity. The wood may be, for example, bent red oak dowel. Other woods could also be used. The metal may be, for example, machined or extruded aluminum. Other metals or metal alloys could also be used. The composite may be, for example, thermoplastics, including polyetheretherketone (PEEK), polyamide-imide (Torlon), amorphous polyetherimide (Ultem), Nylon 6, Nylon 12, or Nylon 66; or may be, for example, thermosets including Lytex, epoxy, or bismaleimide (BMI). Other composites could also be used. The composites may be formed via an injection molding processing, a compression molding process, a selective laser sintering process, a thermoforming process, or an autoclave/over cure process, for example.

Specifically, for example, the duct ring 108 may be formed of a prepeg plain weave epoxy fabric. The avionics mounting tubes 122, vane shaft 902, tail cone lid 906, stator slipstreams 112, and inter-duct slipstreams 116 may be formed of aluminum. The landing leg 120 may be formed of oak, composite, or aluminum. The tail cone hinge 908, tail cone latch 910, and servo gear 914 may be formed of nylon. The stator mounts 113, motor mounts 110, inter-duct interconnects 118, avionics interconnects 124, landing gear mount 602, and avionics mount 606 may be formed of an injection molded composite. The injection molded composite could be nylon similar to that used for the tail cone hinge 908, for example. The selection of the materials in key frangibility locations such as the stator mount 113 or inter-duct interconnect 1018 and motor mounts 110 are made based on expected impact stress levels that define fiber lengths and resin materials necessary to maintain structural integrity. Semi-rigid foam materials, that disintegrate upon impact (having tensile strengths below 100) can be applied to aerodynamic surfaces such as duct lip, control vanes and tail cones. Short fiber composites that exhibit a brittle nature (shear modulus of approximately 5.9e+05, modulus of elasticity of approximately 6.5e+05, ultimate tensile strength of approximately 7250) on impact can be applied to the structural interconnecting joints and leg mounts and motor mounts that separate on high speed impacts. However, it should be understood that these are just examples, and that structural components may be formed of any one or more of the high rigidity materials noted earlier.

By providing rigid structural materials, an increased rigidity of a light weight UAV 100 can be provided, and the length of service and durability of the light weight UAV 100 may be improved.

Aerodynamic elements such as the duct lip 106, vanes 114, tail cone 203, and tail bumper 912 may be manufactured of a foam material. The foam material may be, for example, a soft or rigid foam including expanded polyethylene (EPE), Low Density Polyethylene (LDPE), expanded polystyrene (EPS), or expanded polypropylene (EPP). The foam materials may be formed via a foam injection molding process. For example, the duct lip 106 may be formed of a molded EPE foam material. The aerodynamic elements can be formed separately from (e.g. not integrally with) and in a manner to be detachably connected to the structural components so as to allow for easy replacement of the light-weight aerodynamic parts as necessary.

Additional or other UAV structural or aerodynamic elements may be comprised of a corresponding structural or aerodynamic material.

A UAV 100 comprised of a mix of lighter weight aerodynamic elements and more rigid supporting elements preferably has a total system weight of about or under 4 pounds. More preferably, a UAV 100 comprised of a mix of lighter weight aerodynamic elements and more rigid supporting elements preferably has a total system weight of about or under 2 pounds. Importantly, however the disclosed low weight and frangibility techniques can also be applied to larger airframes.

For example, each ducted fan assembly 102 preferably has a total weight of equal to or less than 0.786 lbs. Each tail cone assembly 202 preferably has a total weight of equal to or less than 0.114 lbs. Each duct linkage assembly 104 preferably has a total weight of equal to or less than 0.217 lbs. A total weight of the UAV 100, including battery 804, is preferably equal to or less than 2.04 lbs.

The motor 109 may be an electric motor powered by the battery 804 contained in the avionics payload 126. The battery 804 could be, for example, a lithium-based power source including, lithium, lithium-ion, lithium-polymer, and/or lithium aluminum hydride batteries. Of course, any other type of battery, including a fuel cell, could be used, as long as it provides sufficient power to drive the motor and sufficient power density to provide an extended operating time period. The use of an electric motor also minimizes vibration and decreases maintenance costs in the UAV 100.

Figure 12:
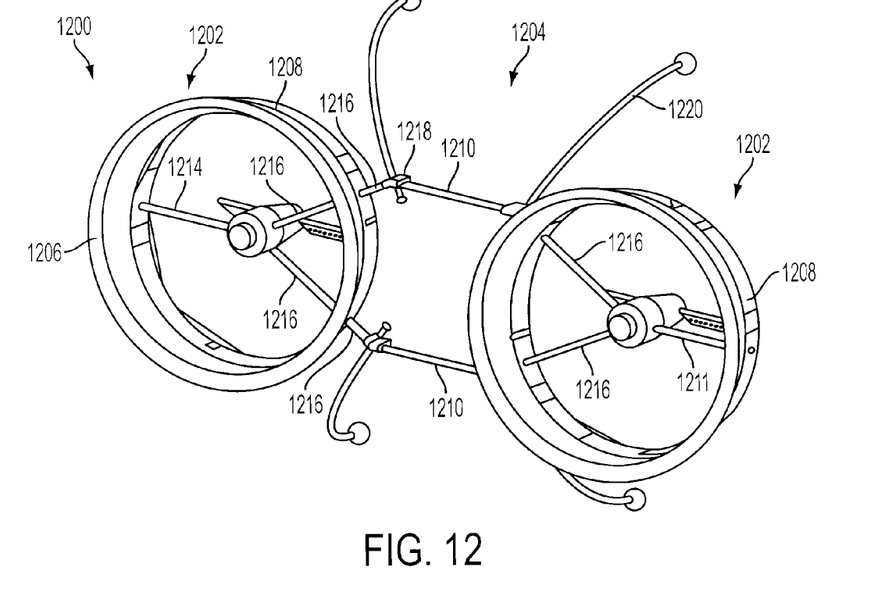
FIG. 12 is a perspective view of an Unmanned Aerial Vehicle (UAV) according to an alternate embodiment.

FIG. 12 sets forth an alternate embodiment of a UAV 1200. Each ducted fan assembly 1202 is the same or similar to that of the ducted fan assemblies 102 of UAV 100. However, UAV 1200 includes a duct linkage assembly 1204 with a parallel set of inter-duct slipstreams 1210 that are displaced in a same horizontal plane as stator slipstreams 1216. In the embodiment of FIG. 12, the stator slipstreams 1216 of UAV 1200 extend beyond the duct ring 1208 and connect with inter-duct interconnects 1218.

Figure 13:
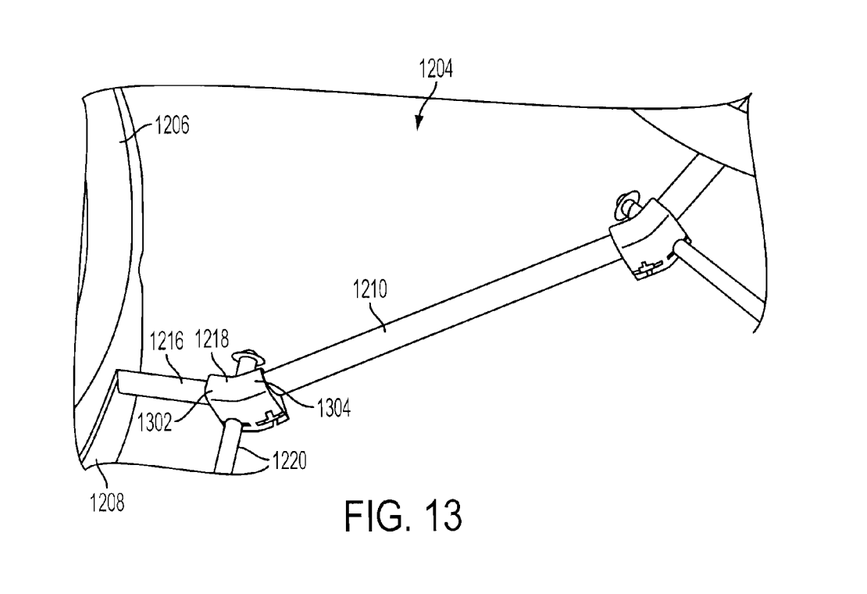
FIG. 13 is a close-up view of an example stator slipstream, leg, duct linkage, and connector of FIG. 12.
Figure 14A:
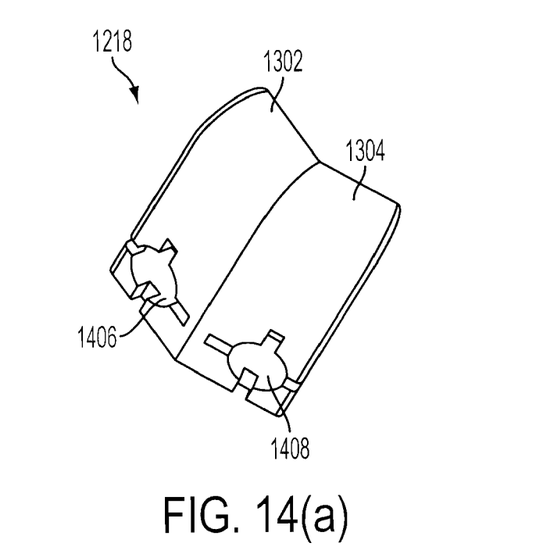
FIG. 14 is a close-up view of the example connector of FIG. 13.
Figure 14B:
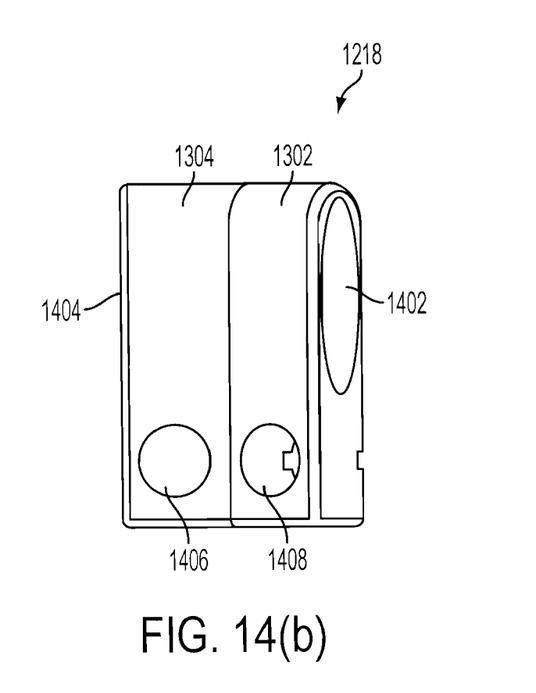

As shown in FIG. 13, the inter-duct interconnects 1218 include an angular offset between a stator slipstream interface side 1302 and an inter-duct slipstream interface side 1304. The angular offset may be, for example, in the range of 15-45°. Most preferably, the angle is approximately 30°. FIGS. 14(*a*) and 14(*b*) show alternate views of the inter-duct interconnect 1218. Each inter-duct interconnect 1218 includes a landing leg through hole 1406 and 1408 formed respectively on each of the stator slipstream interface side 1302 and inter-duct slipstream interface side 1304. One of the two landing leg through holes 1406 and 1408 is utilized in each of the four positions of the duct linkage assembly 1004. By forming two leg through holes 1406/1408 in each inter-duct interconnect, the part becomes common for all four positions. In this manner, the same manufactured inter-duct interconnect 1218 design can be used on either side of the duct linkage assembly 1204 to connect a landing leg 1220 to the UAV 1200. A shaft of each landing gear 1220 is pinned to mate to notches the through holes 1206 and 1208 of the inter-duct interconnect 1218. A spring (not shown) on the opposite side of the inter-duct interconnect holds the landing gear 1220 in position along with a washer and screw.

As shown in FIG. 14(*b*), each inter-duct interconnect 1218 includes tear-shaped holes 1402 and 1404 for interfacing with similarly-shaped inter-duct slipstreams 1210 and similarly-shaped stator slipstreams 1216.

The disclosure above regarding UAV 100 can be equally applied to UAV 1200, including choices of structural and aerodynamic elements, structural element composition, aerodynamic element composition, and overall weight. The inter-duct interconnects 1218 are structural elements and may be made of an injection molded composite, for example, nylon. Furthermore, although not shown in FIG. 12, an avionics payload and mounting tubes could also be attached to the UAV 1200 of FIG. 12 to provide a centrally-located power source and flight control circuitry.

Note that while examples have been described in conjunction with present embodiments of the application, persons of skill in the art will appreciate that variations may be made without departure from the scope and spirit of the application. The true scope and spirit of the application is defined by the appended claims, which may be interpreted in light of the foregoing.

I claim:

1. An unmanned aerial vehicle (UAV) comprising:
    a ducted fan comprising a duct ring and a duct lip connected to the duct ring;
    a plurality of aerodynamic components comprised of a light weight foam material, the plurality of aerodynamic components comprising the duct lip; and
    a plurality of structural components configured to support and interconnect the aerodynamic components, the plurality of structural components comprising the duct ring, wherein the structural components each comprise at least one of a metal, wood, or composite material, and wherein at least one structural component of the plurality of structural components comprises a frangible resin material having a fiber length configured to separate or disintegrate upon application of a predetermined stress level, wherein the frangible resin material and the fiber length are selected based on the predetermined stress level.

2. The UAV according to claim 1, wherein the ducted fan comprises a first ducted fan, the duct ring comprises a first duct ring, and the duct lip comprises a first duct lip, the first ducted fan further comprising a first substantially centrally disposed motor and a first plurality of stator slipstreams securing the first motor to the first duct ring, wherein the plurality of structural components comprises the plurality of stator slipstreams, the UAV further comprising:
a second ducted fan comprising a second duct ring, a second duct lip connected to the second duct ring, a second motor, and a second plurality of stator slipstreams securing the second motor to the second duct ring; and
a duct linkage coupled to stator slipstreams of the first and second plurality of stator slipstreams.

3. The UAV according to claim 2, further comprising:
an avionics payload comprising a power source and a flight control circuitry, the avionics payload being mounted adjacent the duct linkage;
wherein the duct linkage comprises a plurality of hollow inter-duct slipstreams, and wherein wiring connecting the avionics payload with the first motor is routed inside the hollow inter-duct slipstreams.

4. The UAV according to claim 2, further comprising interconnects connecting the duct linkage to the first ducted fan, wherein the interconnects each comprise a first portion configured to interface with a stator slipstream of the first plurality of stator slipstreams, the stator slipstream extending through the first duct ring, and a substantially symmetrical second portion set at an angle offset from the first portion and configured to interface with the duct linkage.

5. The UAV according to claim 2, wherein the first duct ring includes a plurality of through holes configured to receive the first plurality of stator slipstreams, and wherein a plurality of stator mounts are provided on an outer surface of the first duct ring, the plurality of stator mounts being configured to secure the first plurality of stator slipstreams to the first duct ring.

6. The UAV according to claim 1, further comprising a motor and a tail cone assembly disposed in the ducted fan, the tail cone assembly comprising a tail cone and a vane, wherein the plurality of aerodynamic components comprises the tail cone and the vane.

7. The UAV according to claim 6, further comprising a servo disposed within the tail cone, wherein the servo is configured to control a tilt angle of the vane.

8. The UAV according to claim 1, wherein the wood is oak, the metal is aluminum, and the composite is selected from the group consisting of thermoplastics, nylons, or thermosets.

9. The UAV according to claim 1, wherein the light weight foam material is selected from the group consisting of expanded polyethylene (EPE), Low Density Polyethylene (LDPE), expanded polystyrene (EPS), and expanded polypropylene (EPP).

10. The UAV according to claim 1, wherein the frangible resin material and fiber length is are selected based on maximum impact stress levels that the UAV is expected to be subjected to.

11. The UAV according to claim 1, wherein the at least one of the structural component comprising the frangible resin material is a structural component selected from the group consisting of an inter-duct interconnect, a landing gear mount, an avionics mount, a stator mount, and a motor mount.

12. The UAV according to claim 1, wherein the predetermined stress level is a first predetermined stress level, and wherein at least one aerodynamic component of the plurality of aerodynamic components comprises a frangible foam material configured to disintegrate upon application of a second predetermined stress level.

13. The UAV according to claim 12, wherein the at least one aerodynamic component comprising a frangible foam material includes at least one of a tail cone and a duct lip.

14. The UAV according to claim 1, wherein the wood is oak, the metal is aluminum, and the composite is selected from the group consisting of thermoplastics, nylons, or thermosets, and wherein the light weight foam material is selected from the group consisting of expanded polyethylene (EPE), Low Density Polyethylene (LDPE), expanded polystyrene (EPS), and expanded polypropylene (EPP).

15. The UAV according to claim 1, wherein the at least one structural component comprising the frangible resin comprises a structural component configured to interconnect at least two aerodynamic components.

16. An unmanned aerial vehicle (UAV) comprising:
a ducted fan comprising a duct ring, a duct lip connected to the duct ring, and a plurality of fan blades;
a motor configured to rotate the plurality of fan blades;
a stator slipstream connected to the duct ring via a stator mount;
a motor mount connected to the duct ring via the stator slipstream, wherein the motor is mounted on the motor mount;
a tail cone;
a control vane assembly connected to the tail cone, the control vane assembly comprising:
a vane shaft; and
a plurality of vanes connected by the vane shaft, wherein the plurality of vanes is configured to direct air flow from the ducted fan,
wherein at least one of the duct lip, a vane of the plurality of vanes, or the tail cone comprise a light weight foam material, and
wherein at least one of the duct ring, the motor, a fan blade of the plurality of fan blades, the stator slipstream, or the vane shaft comprise at least one of metal, wood, or composite material, and wherein at least one of the motor mount or the stator mount comprises a frangible resin material having a fiber length configured to disintegrate or separate upon application of a predetermined stress level, wherein the material and fiber length are selected based on the predetermined stress level.

17. A method of manufacturing an unmanned aerial vehicle (UAV), the method comprising:
manufacturing a plurality of structural components of a material selected from the group comprising solid metal, wood, or composite material, wherein the structural components comprise a duct ring of a ducted fan of the UAV, wherein at least one structural component of the plurality of structural components comprises a frangible resin material having a fiber length configured to separate or disintegrate upon application of a predetermined stress level, and wherein the material and fiber length are selected based on the predetermined level of stress;
manufacturing aerodynamic components of a light-weight foam material, the aerodynamic components comprising a duct lip of the ducted fan; and
assembling the structural components and the aerodynamic components such that the aerodynamic components are supported and interconnected by the structural components, and the aerodynamic components are detachable from the structural components.

18. The method according to claim 17, wherein assembling the structural components and the aerodynamic components includes attaching the duct ring to the duct lip.

19. The method according to claim 17, wherein the wood is oak, the metal is aluminum, and the composite is selected from the group consisting of thermoplastics, nylons, or thermosets.

20. The method according to claim 17, wherein the light weight foam material is selected from the group consisting of expanded polyethylene (EPE), Low Density Polyethylene (LDPE), expanded polystyrene (EPS), and expanded polypropylene (EPP).

* * * * *

UNITED STATES PATENT AND TRADEMARK OFFICE
CERTIFICATE OF CORRECTION

| | | |
|---|---|---|
| PATENT NO. | : 8,328,130 B2 | Page 1 of 1 |
| APPLICATION NO. | : 12/506052 | |
| DATED | : December 11, 2012 | |
| INVENTOR(S) | : Emray R. Goossen et al. | |

It is certified that error appears in the above-identified patent and that said Letters Patent is hereby corrected as shown below:

In the Claims

Col. 11, Line 57 (Claim 10), "is are" should be -- are --

Col. 11, Line 61 (Claim 11), "of the structural" should be -- structural --

Signed and Sealed this
Eleventh Day of June, 2013

Teresa Stanek Rea
*Acting Director of the United States Patent and Trademark Office*